(12) United States Patent
Kapuria (10) Patent No.: US 11,228,734 B2
(45) Date of Patent: *Jan. 18, 2022

(54) SINGLE CASING ADVANCED DRIVER ASSISTANCE SYSTEM

(71) Applicant: THE HI-TECH ROBOTIC SYSTEMZ LTD, Haryana (IN)

(72) Inventor: Anuj Kapuria, Haryana (IN)

(73) Assignee: THE HI-TECH ROBOTIC SYSTEMZ LTD, Gurugram (IN)

( * ) Notice: Subject to any disclaimer, the term of this patent is extended or adjusted under 35 U.S.C. 154(b) by 52 days.

This patent is subject to a terminal disclaimer.

(21) Appl. No.: 16/783,137

(22) Filed: Feb. 5, 2020

(65) Prior Publication Data

US 2020/0177840 A1 Jun. 4, 2020

Related U.S. Application Data

(63) Continuation-in-part of application No. 15/597,950, filed on May 17, 2017, now Pat. No. 10,595,005.

(30) Foreign Application Priority Data

Mar. 10, 2017 (IN) .............................. 201711008491

(51) Int. Cl.
| | |
|---|---|
| H04N 7/18 | (2006.01) |
| H04N 5/225 | (2006.01) |
| H04N 5/232 | (2006.01) |
| H04N 5/247 | (2006.01) |
| H04N 13/204 | (2018.01) |
| G01S 7/481 | (2006.01) |

(Continued)

(52) U.S. Cl.
CPC ............. *H04N 7/18* (2013.01); *G01S 7/4813* (2013.01); *G01S 17/86* (2020.01); *H04N 5/2252* (2013.01); *H04N 5/2253* (2013.01); *H04N 5/23299* (2018.08); *H04N 5/247* (2013.01); *H04N 13/204* (2018.05); *G05D 1/0231* (2013.01); *G05D 2201/0213* (2013.01)

(58) Field of Classification Search
CPC ...... G01S 17/86; G01S 17/931; G01S 7/4813; G03B 35/08; G05D 1/0231; G05D 2201/0213; H04N 13/204; H04N 13/239; H04N 2213/001; H04N 5/2252; H04N 5/2253; H04N 5/2257; H04N 5/2258; H04N 5/23299; H04N 5/247; H04N 7/18; H04N 7/181
See application file for complete search history.

(56) References Cited

U.S. PATENT DOCUMENTS

| | | | | |
|---|---|---|---|---|
| 2008/0201033 | A1* | 8/2008 | DeMersseman | G01B 21/24 701/30.5 |
| 2010/0228435 | A1* | 9/2010 | Higgins-Luthman | B60R 1/12 701/36 |
| 2014/0085471 | A1* | 3/2014 | Han | B60R 1/08 348/148 |

* cited by examiner

*Primary Examiner* — Anner N Holder (57) ABSTRACT

The present invention provides a vehicle mountable universal driver assistance device. This device includes a housing unit encasing a common module on which are mounted a first camera module, a second camera module, different from the first camera module, and a ranging module. The common module may be moved along an axis to adjust the viewing angle of the first camera, second camera and ranging module. The device can be mounted on windshield of any vehicle and can be calibrated accordingly. The warning from the warning display device is based on the detection of the misalignment of the common module.

13 Claims, 7 Drawing Sheets

(51) Int. Cl.
*G01S 17/86* (2020.01)
*G05D 1/02* (2020.01)

SINGLE CASING ADVANCED DRIVER ASSISTANCE SYSTEM

CROSS REFERENCE TO RELATED APPLICATIONS

The present application is a Continuation-In-Part application of U.S. patent application Ser. No. 15/597,950 filed on May 17, 2017, which further claims the benefit of Indian Patent Application No. 201711008491 filed on Mar. 10, 2017. All the above are hereby incorporated by reference. the contents of which are incorporated herein by reference in their entirety.

TECHNICAL FIELD

This invention relates to an advanced driver assistance system (ADAS) and more particularly to a single casing advanced driver assistance device.

BACKGROUND OF THE INVENTION

Driver assistance systems are being widely used these days in vehicles. These systems help a driver to be attentive to the road by providing various kinds of information to the driver of the vehicle. Typically, such systems are in-built to the vehicle and vary from vehicle to vehicle. Since these are in-built into the vehicle, hence are already calibrated and cannot be utilized for any other vehicle. Also, if such systems do require calibration it is not easy and requires sophisticated techniques and tools.

Therefore, there exists the need for a better universal solution to provide freedom of usage to users of vehicle.

SUMMARY

The present invention comprises an advanced driver assistance device having one or more of the features recited in the appended claims and/or one or more of the following features, which alone or in any combination may comprise patentable subject matter:

The objective of the invention is to provide a universal/generic advanced driver assistance device that may be retrofitted to vehicles of different types and sizes.

Accordingly, in an embodiment of the invention, there is provided a vehicle mountable reconfigurable advanced driver assistance device. The device includes a single housing unit enclosing a common module. The common module is configured to move along an axis to adjust a vertical angle of the common module. The device further includes a first camera module that is arranged on the common module, wherein the first camera module (comprises a stereoscopic camera) of a short focal length that detects activity within a close-rage vicinity of the vehicle and distance of objects within the close-range vicinity; the device further includes a second camera module, that is different from the first camera module, arranged on the common module, wherein the second camera module has a longer focal length in order to detect activity within a long-range vicinity of the vehicle and distance of objects within the long-range vicinity; the device further includes a ranging module, arranged on the common module, such that it is in close proximity to the second camera module, and it is configured to detect distance between the vehicle with frontal object such as a vehicle present in front of the vehicle; and wherein the movement of the common module along the axis simultaneously changes vertical viewing angle/field of view of the first camera module, the second module and the ranging module. The device may further include a microphone array or multiple directional sound sensors for determining ambient noise.

In an embodiment of the invention, the device includes a warning display device to provide a warning to the driver either upon the detection of misaligned common module or detection of misalignment of different monitoring modules arranged on the common module. The intensity of the warning may be varied based on the level of misalignment of the common module of the ADAS.

Additional features and advantages are realized through the techniques of the present disclosure. Other embodiments and aspects of the present disclosure are described in detail herein and are considered a part of the present disclosure. For a better understanding of the present disclosure with advantages and features, refer to the description and to the drawings.

The ADAS system can be calibrated to be used in different types of vehicle like truck, cars and buses by changing the forward looking angle of the system and adjusting the system parameters. The ADAS system may also be reconfigured to work with both right-hand driven and left-hand driven vehicles.

BRIEF DESCRIPTION OF THE ACCOMPANYING DRAWINGS

The foregoing summary, as well as the following detailed description of various embodiments, is better understood when read in conjunction with the drawings provided herein. For the purpose of illustration, there is shown in the drawings exemplary embodiments; however, the presently disclosed subject matter is not limited to the specific methods and instrumentalities disclosed.

DETAILED DESCRIPTION OF THE INVENTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1A:
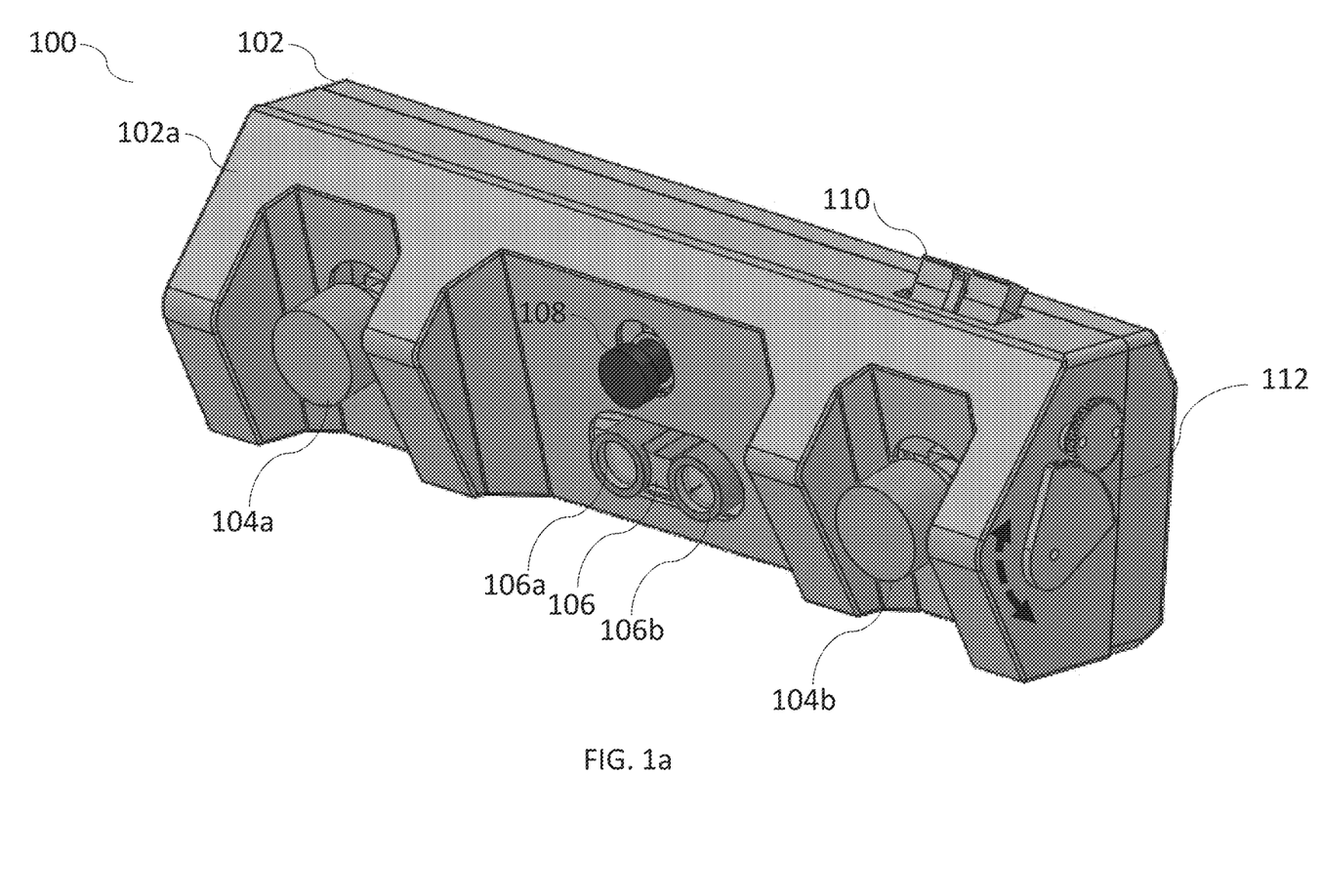
FIG. 1a is a line diagram illustrating perspective view of a driver assistance device, in accordance with an embodiment of the invention.

Referring now to FIG. 1a, illustrating a line diagram of perspective view of a autonomous driver assistance device 100 (further referred as device), in accordance to an embodiment of the invention. The device 100 includes a single housing unit 102. The single housing unit 102 can be made up of any one or a combination of a plastic, a fiber, or a metal. In other embodiments of the invention, the single housing unit 102 is an elongated rectangular shaped unit. The single housing unit 102 includes a mounting panel 102a. The mounting panel 102a may include a double-sided tape that may be utilized to mount the device 100 on to the front windshield of a vehicle. However, the mounting panel 102a may also include micro sized suction cups that are utilized to mount the device 100 on to the windshield of the vehicle. The micro sized suction cups can be placed in a scattered manner to provide efficient mounting on to the windshield of the vehicle. In other embodiments of the invention, the DSM 300 can also be mounted on other parts of the vehicle like "A-pillar", etc. wherein the DSM 300 may be attached to the single housing unit 102 or the control box using wire/cable.

The device 100, further includes a connector 110 through which the device 100 is connected to a control box or the vehicle's electronic control unit (ECU).

The device 100, further houses a first camera module 104a, 104b. In an embodiment of the invention, the first camera module 104a, 104b is a stereo camera module that includes twin lenses. As known in the art, a stereo camera includes two or more lenses with a separate image sensor or film frame for each lens. This allows the camera to simulate human binocular vision, and therefore gives it the ability to capture three-dimensional images. Images captured using stereo camera can be utilized to form stereo-views and 3D pictures. Typically, the lenses like 104a, 104b are kept apart by about 6.35 cm that is approximately the distance between human eyes. Hence, the two lenses imitate human eyes and help understanding objects in-front and distance to them. The stereo camera module 104a, 104b is adapted to have a short focal length. The short focal length allows the stereo camera module 104a, 104b to detect objects that are within a close-range proximity (distance may be 6-10 meters) of the vehicle on which the device 100 is mounted. Also, the distance to such objects can be measure using the images captured by the stereo camera module 104a, 104b.

Still referring to FIG. 1a, the device 100 further houses, a second camera module 108. The second camera module 108 is a long-range narrow field camera. This helps the driver of the vehicle on which the device 100 is mounted, to identify objects in long focal length or objects in long-range vicinity of the vehicle (distance 50-60 meters). Hence, the driver is alarmed of any object or activity, road signs, road blocks, etc. in a long-range from the vehicle.

The device 100, further houses a ranging module 106. The ranging module 106, in an embodiment of the invention is a 1D Light Detection and Ranging Module (LiDAR). The LiDAR 106 includes a receiver 106a and transmitter 106b. LiDAR, as known in the art, is based on a surveying method to measure distance to a target after the target is illuminated with a LASER light. In another embodiment, Lidar may be a 1D, 2D or 3D that may utilize ultraviolet, visible, or near infrared light to range objects. It can target a wide range of materials, including non-metallic objects. A narrow laser-beam can map physical features with very high resolutions. LiDAR systems have been used in transportation systems to assist in a variety of vehicular applications like Adaptive Cruise Control (ACC), Emergency Brake Assist, Anti-lock Braking System (ABS) depending on the detection of vehicle environment to act autonomously or semi-autonomously. In an embodiment of the invention the single housing unit 102 further includes a common module 200 on which are arranged the first camera module 104a, 104b, the second camera module 108 and the ranging module 106 that will be explained later in conjunction with FIG. 2.

Further, in an embodiment of the invention, the single housing unit 102 may further includes a gear module 112. The gear module 112 helps in manual adjustment of the vertical viewing angle/field of view of the various optical sensors as described above encased within the device 100. It will be appreciated by a person having ordinary skill in the art that this gear module 112 can also be replaced by one or multiple motors (not shown in the figure) for adjustment of vertical viewing angle/field of view of the various components encased within the device 100.

Figure 1B:
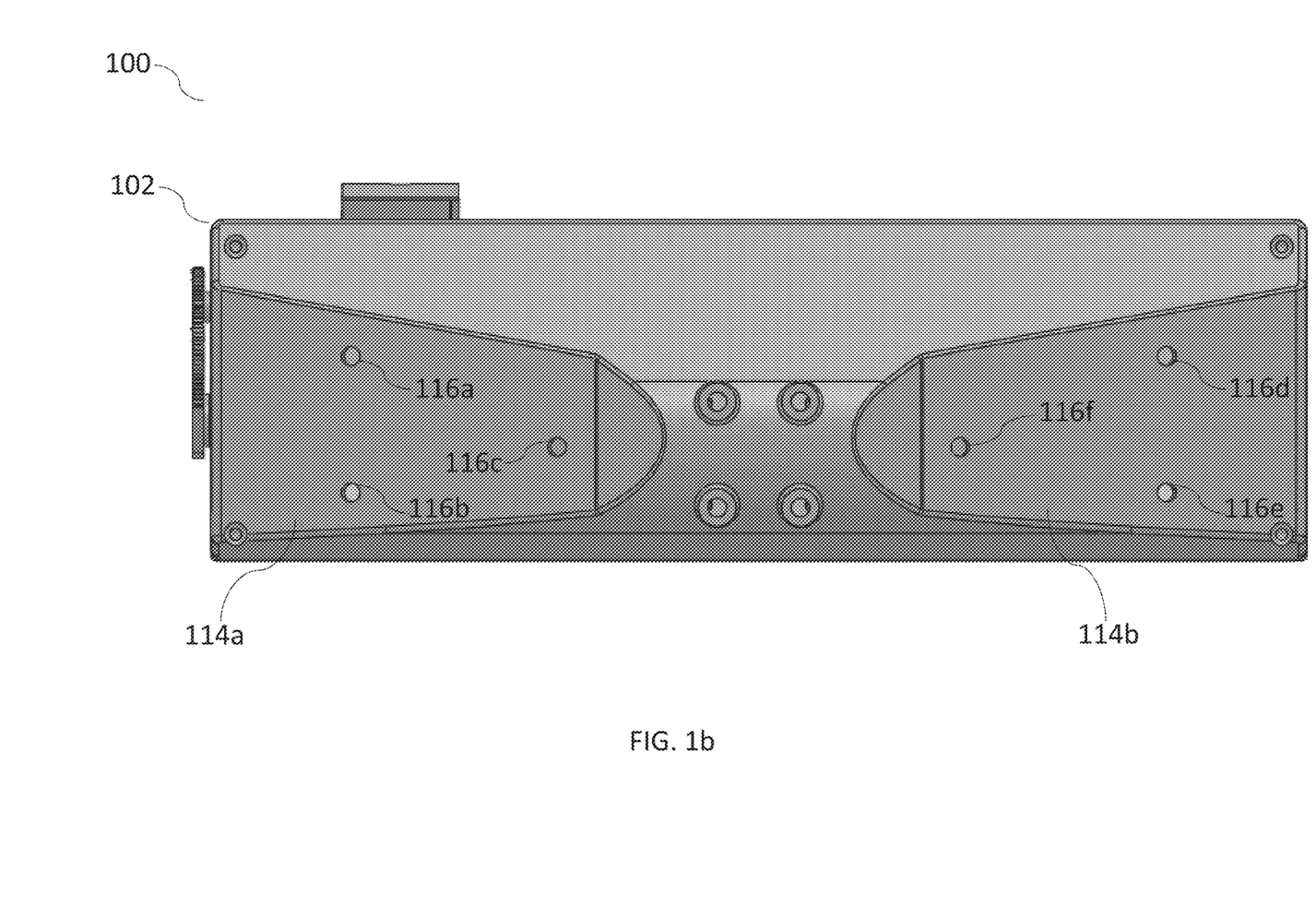
FIG. 1b is a line diagram illustrating rear view of the driver assistance device, in accordance with an embodiment of the invention.

Now referring to FIG. 1b, a line diagram illustrating rear view of the device 100. The device 100 having the single housing unit 102 includes two back panels 114a and 114b. Both back panels 114a and 114b are similar in make Back panel 114a includes mounting holes 116a-116c whereas back panel 114b includes mounting holes 116d-116f that are suitable to mount various other devices that will be explained later within description.

Figure 2:
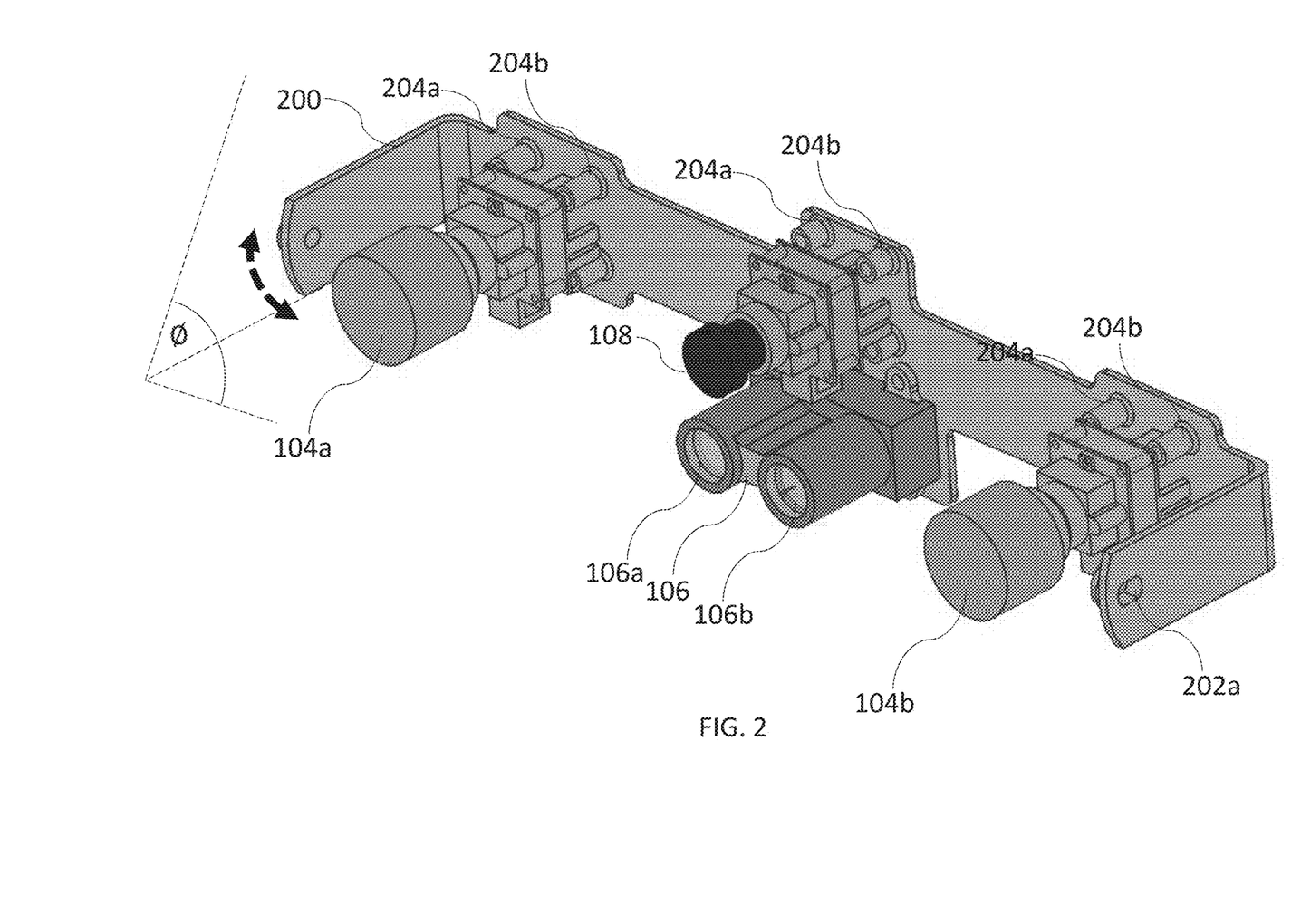
FIG. 2 is a line diagram illustrating a common module in accordance with an embodiment of the invention.

Now referring to FIG. 2, a line diagram illustrating a common module 200 as described above. Common module 200 is placed within the device 100. In an embodiment of the invention, the common module 200 is made up of anyone or a combination of a metal, a plastic, or fiber. Common module 200 includes various components within the device 100 such as a first camera module 104a, 104b, the second camera module 108 and the ranging module 106. All the components are arranged on the common module 200 using fasteners 204a, 204b and others not shown in the figure for ease's sake. As, shown in the figure, the common module 200 includes a groove 202a in order to be fixed to the gear module 112 through a connector (not shown in figured). The connector hence, links the gear module 112 and the common module 200 and therefore, the common module 200 can be moved up or down through its vertical axis/an axis by movement of the gear module 112 manually. As described above, the same effect can be brought by replacing the gear module 112 with one or more than one motors (not shown in figure). The presence of motors can help in electronic or automated adjustment of the field of view of the components mounted on the common module 200 encased within the single housing unit 102 of the device 100. Common module 200 also may include the printed circuit boards (not shown in figure) or mother board required for functioning of the components mounted on it.

Figure 3:
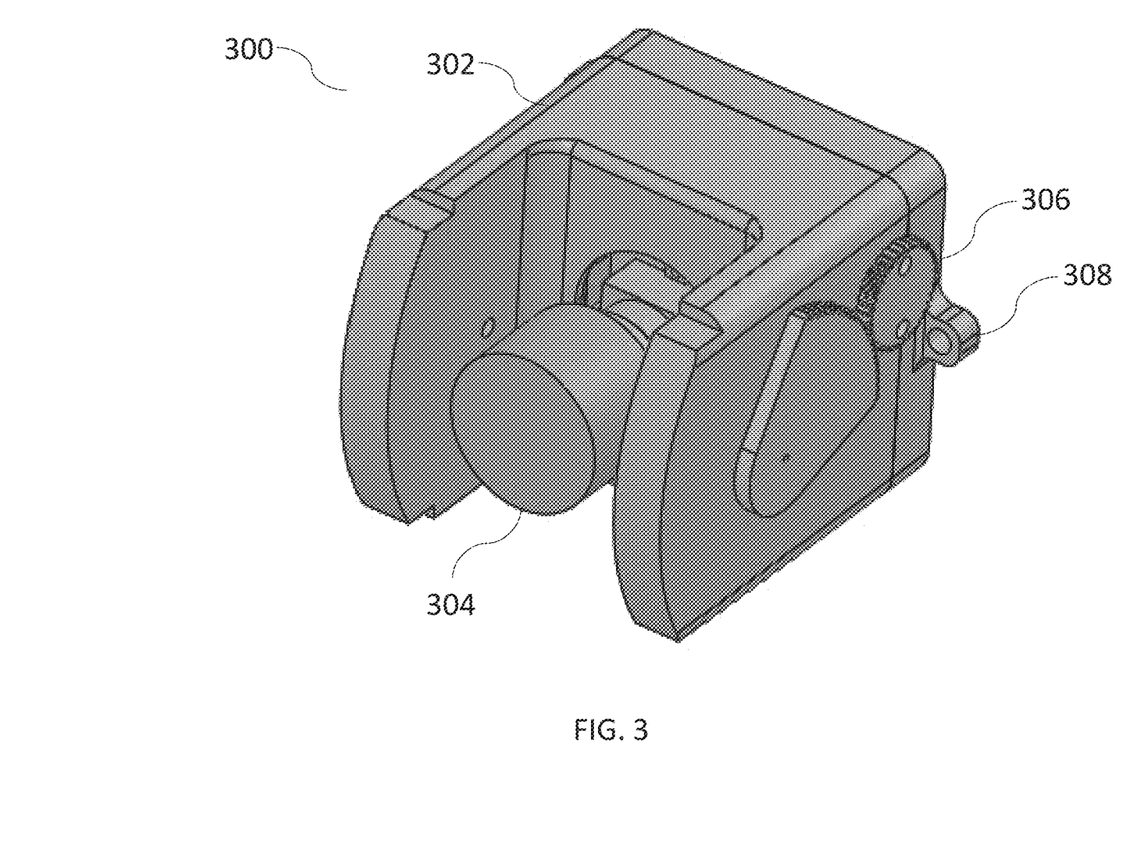
FIG. 3 is a line diagram illustrating a driver state monitoring device, in accordance with an embodiment of the invention.

Now referring to FIG. 3, a line diagram illustrating a driver state monitoring (DSM) device 300. The DSM device 300 is adapted to be fixed to one of the back panels 114a, 114b of the device 100 based on the make of the vehicle on which the device 100 is mounted i.e. whether it is a left-hand drive or a right-hand drive. Hence, even if the DSM device is mounted on the back panel 114b device 100 for a left-hand drive vehicle and it is required to use the device 100 for a right-hand drive vehicle, the DSM can be reconfigured by detaching and then placing it on the other back panel 114b. Further the DSM device 300 includes a camera 304 that identifies state of the driver and various demographics of the driver. Hence, the camera 304 can perform driver profiling and identify emotional state of the driver as well that can be utilized to perform various other functions. The camera 304 is encased within a housing 302. The housing 302 can be made up of anyone or a combination of a metal, fiber, plastic, etc. the housing 302 further includes a mounting bracket 308 for mounting the DSM device 300 on to one of the back panels 114a, 114b of device 100. The DSM device 300 also includes a gear module 306 that can be utilized to manually adjust the angle of the camera. In other embodiments of the invention, the gear module 306 can be replaced using one or multiple motors to automate angle adjustment of the camera 304.

Figure 4:
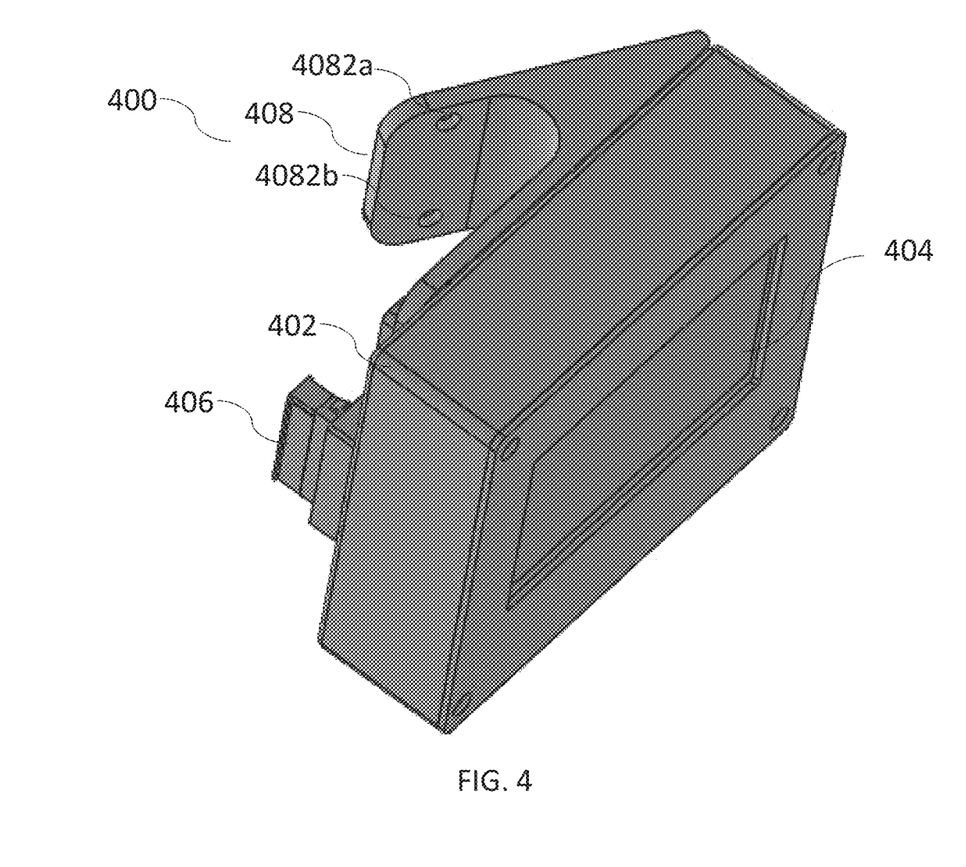
FIG. 4 is a line diagram illustrating a warning display device, in accordance to an embodiment of the invention.

Now referring to FIG. 4, a line diagram illustrating a warning display device 400 adapted to be mounted on to one of the back panels 114a, 114b of the device 100. The warning display device 400 can be either a display device for a visual warning, or can give an audio-visual warning, an audio warning alone. The warning display device 400 includes a housing unit 402 encasing a display 404. The housing unit 402 can be made up of anyone or a combination of a plastic, a metal, or a fiber. The display 404 can be chosen from a group comprising a thin film transistor display, an LED display, an OLED display, an LCD, a Plasma screen, a projection display, a micro-display etc. it may also be a touch screen of either capacitive or resistive nature for user interaction. The touch screen interface of the display 404 may be replaced by a tactile keyboard. A speaker or a buzzer may be included in the display device for providing audio warning and alerts. The speaker may be substituted by a mechanical sound producing device. The housing unit 402 further includes connector 406 for connection to the device 100. Furthermore, the housing unit 402 includes mounting bracket 408 that includes mounting holed 4082a and 4082b through which the housing 402 can be mounted on to anyone of the back panels 114a, or 114b based on the type of vehicle i.e. right-hand drive or left-hand drive vehicle. Also, as like the DSM device 300, the warning display device 400 can be also be reconfigured based on the type of vehicle on which the device 100 is being mounted.

Further, in an embodiment of the invention, the warning display device 400 may provide the different level of waning based on either common module 200 alignment with all components or a single component alignment on the common module 200. In example, if the field of view of all components mounted on the common module 200 encased within the single housing unit 102 of the device 100 is not aligned with the vehicle then the intensity of the feedback is sever or color of visual warning may be bright. Further, if any single component on the common module 200 is not aligned with the vehicle, then the intensity of the feedback is mild, or color of visual warning may be dull/mild.

Figure 5:
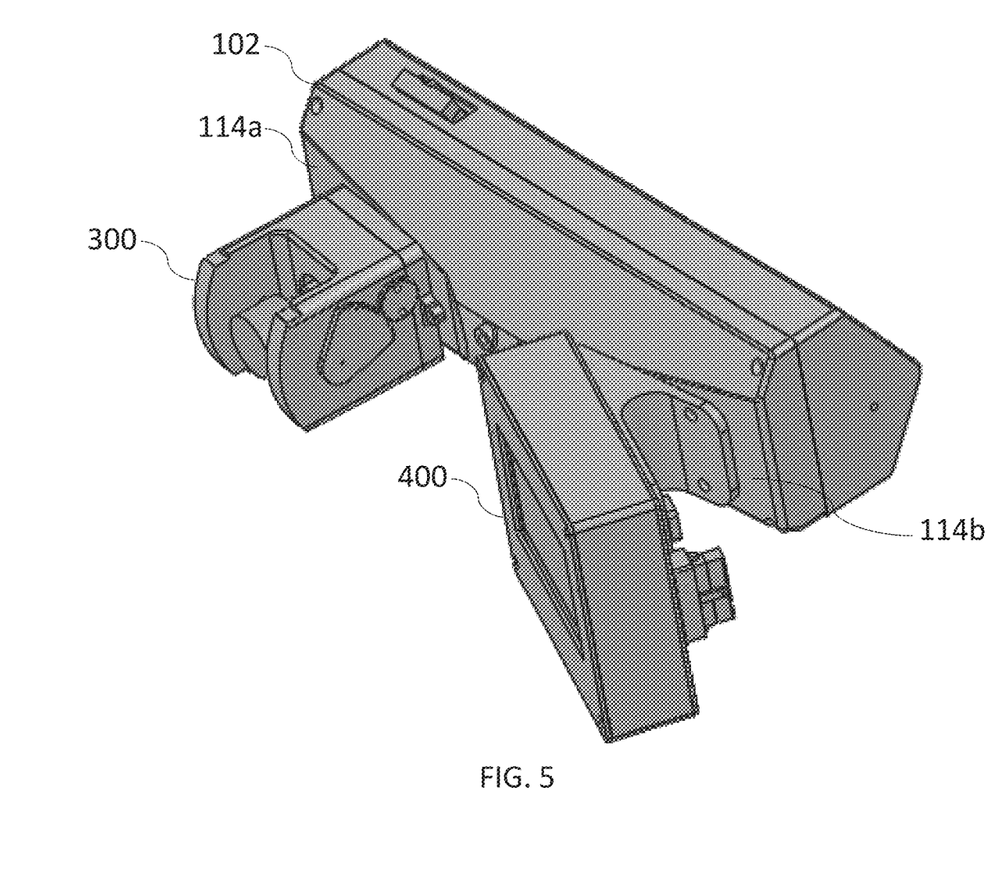
FIG. 5 is a line diagram illustrating rear view of a driver assistance device with attached driver state monitoring device and display device, in accordance to an embodiment of the invention.

Now referring to FIG. 5, a line diagram illustrates a rear view of complete device 100 along with attached DSM device 300 mounted on to back panel 114a and the warning display device 400 mounted on the back panel 114b. As indicated in detailed description, the DSM device 300 and warning display device 400 can be placed on either of the mounting panels 114a, 114b based on the type of drive of the vehicle i.e. for left-hand or right-hand drive vehicle.

Figure 6:
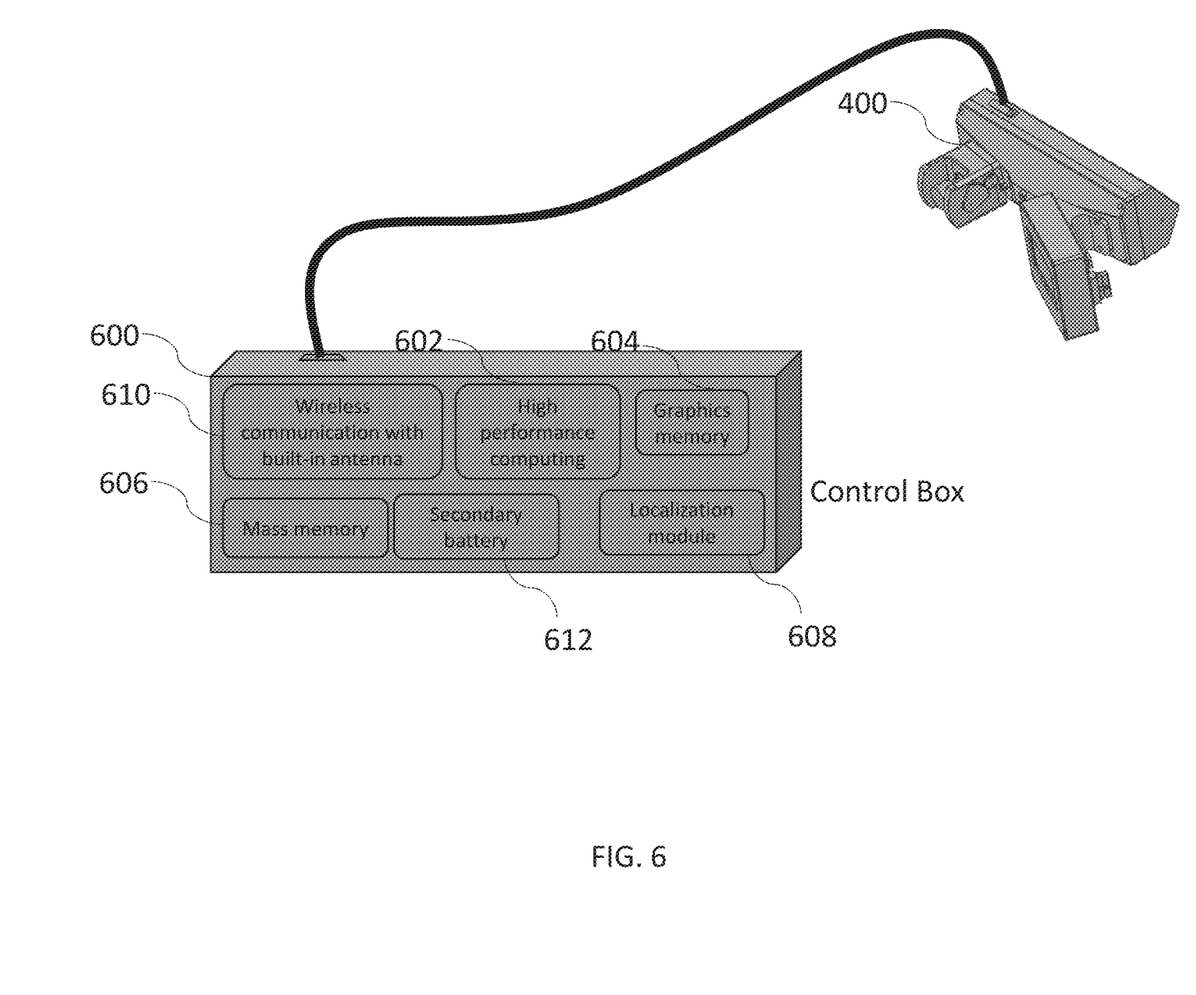
FIG. 6 is a line diagram illustrating a control box of a driver assistance device with its internal components.

Now referring to FIG. 6 a line diagram illustrating a control box 600 to which the device 100 is communicatively linked using a wired or wireless communication module, for transferring real-time data from sensors to the control box 600 and receiving commands from the control box 600. The wired means may use a wire, cable, umbilical cable, optical cable, or any of the similar wired communication links. The wireless means may be a proprietary short range radio link, Bluetooth, Wi-Fi, or any of the similar wireless communication technologies. The control box 600 comprises a high performance computing module 602 that utilizes a graphics memory 604 to perform real-time image processing, data fusion and Artificial intelligence (AI). A mass memory 606 is included in the control box 600 for permanent storage of large amount of data related to deep learning technique (AI), sensor calibration, driver profile, vehicle profile, ADAS operation log etc. A GPS or satellite based localization modules 608 is also included in the control box 600 to provide accurate position of the vehicle in the physical world. The control box 600 also includes a long-range wireless communication module 610 for communicating with a central server. The long-range wireless communication module enables the control to communicate using a cellular/WI-FI/WiMAX/ISM communication, vehicle-to-vehicle network or satellite communication.

The control box 600 and the device 100 are powered by the vehicle's power supply. Furthermore, the control box may comprise of a secondary power source 612 such as a rechargeable battery or an ultra-capacitor. The secondary power source 612 may provide operational power to the system in case of emergency, accident, electronic failure, theft, remote operations.). The system is designed to operate at 24/12 V DC power supply, however, system may also work in a low power mode using internal battery. The power ON circuit may be programmed to operate while vehicle is in motion and automatically switch off after 15 minute of vehicle use. The GPS, vision and other sensors data may be used to determine whether the vehicle is in use or parked/unused.

The ADAS is designed to be retrofitted to an existing vehicle and provide advance warning/alert features to a driver. Additionally, the sides of the ADAS device may include multiple sound detectors or a microphone array arrangement to detect noise from surrounding of the vehicle. The ambient sound of the driver and vehicle may be fed to the control box for processing and classification.

Aspects of the present subject matter are described herein with reference to flowchart illustrations and/or block diagrams of methods and apparatus (systems) according to embodiments of the subject matter. It will be understood that each block of the flowchart illustrations and/or block diagrams, and combinations of blocks in the flowchart illustrations and/or block diagrams, can be implemented by computer readable program instructions.

While there has been shown, and described herein what are presently considered the preferred embodiments of the present disclosure, it will be apparent to those skilled in the art that various changes and modifications can be made therein without departing from the scope of the present disclosure as defined by the appended claims.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While certain embodiments have been described, these embodiments have been presented by way of example only, and are not intended to limit the scope of the present disclosure. Indeed, the novel methods, devices, and systems described herein may be embodied in a variety of other forms. Furthermore, various omissions, substitutions, and changes in the form of the methods, devices, and systems described herein may be made without departing from the spirit of the present disclosure. The accompanying claims and their equivalents are intended to cover such forms or modifications as would fall within the scope and spirit of the present disclosure.

The invention claimed is:

1. A vehicle mountable advanced driver assistance device comprising;
    a single housing unit;
    a common module disposed within the housing unit and configured to move along a vertical axis;
    a first camera module, arranged on the common module, wherein the first camera module has a short focal length for detecting activity within a close-range vicinity of the vehicle and distance of objects within the close-range vicinity;
    a second camera module, different from the first camera module, arranged on the common module, wherein the second camera module has a long focal length for detecting activity within a long-range vicinity of the vehicle and distance of objects within the long-range vicinity;
    a ranging module, arranged on the common module next to the second camera module, configured to measure a distance between the vehicle and an object present in front of the vehicle, and
    a warning display device, arranged on the common module, configured to generate a warning for the driver upon a detection of misalignment of the common module;
    wherein movement of the common module is configured to simultaneously adjust a vertical viewing angle of the first camera module, second module, and the ranging module;
a driver state monitoring device attached to one side of rear part of the device and configured to detect activity of a driver of the vehicle; and
a display device attached to one side of rear part of the device and configured to provide a user interface of the driver of the vehicle; wherein the driver monitoring device and the display device may be interchangeably replaced based on driver configuration of the vehicle.

2. The vehicle mountable advanced driver assistance device of claim 1, wherein, the movement of the common module is manual or automatic.

3. The vehicle mountable advanced driver assistance device of claim 2, wherein the common module is attached to a gear module placed on exterior part of the housing unit to move the common module for manual movement.

4. The vehicle mountable advanced driver assistance device of claim 2, wherein the housing unit includes a motorized mechanism to move the common module electronically for automatic movement.

5. The vehicle mountable advanced driver assistance device of claim 1, wherein the driver state monitoring device is attached to a side, of rear part of the device, that is closer to a driving side of the vehicle.

6. The vehicle mountable advanced driver assistance device of claim 1, wherein the display device is attached to a side, of rear part of the device, that is farther form the driving side of the vehicle.

7. The vehicle mountable advanced driver assistance device of claim 1, wherein the device is configured to interact with a remote system using wireless communication.

8. The vehicle mountable advanced driver assistance device of claim 7, wherein the wireless communications are land based wireless communication, or a satellite communication.

9. The vehicle mountable advanced driver assistance device of claim 1, wherein, the first camera module comprising a stereoscopic camera.

10. The vehicle mountable advanced driver assistance device of claim 1, wherein the second camera module is a long-range narrow field camera.

11. The vehicle mountable advanced driver assistance device of claim 1, wherein, the ranging module is a light detection and ranging (LiDAR) unit.

12. The vehicle mountable advanced driver assistance device of claim 1, wherein the housing unit is made up of anyone or a combination of a plastic, a polymer, a composite material, a fiber, or a metal.

13. The vehicle mountable advanced driver assistance device of claim 1, wherein, the common module is made up of anyone or a combination of a plastic, a fiber, or a metal.

* * * * *